Nov. 12, 1963  L. D. WARREN  3,110,391
REVERSIBLE CONVEYOR
Filed April 24, 1961  2 Sheets-Sheet 1
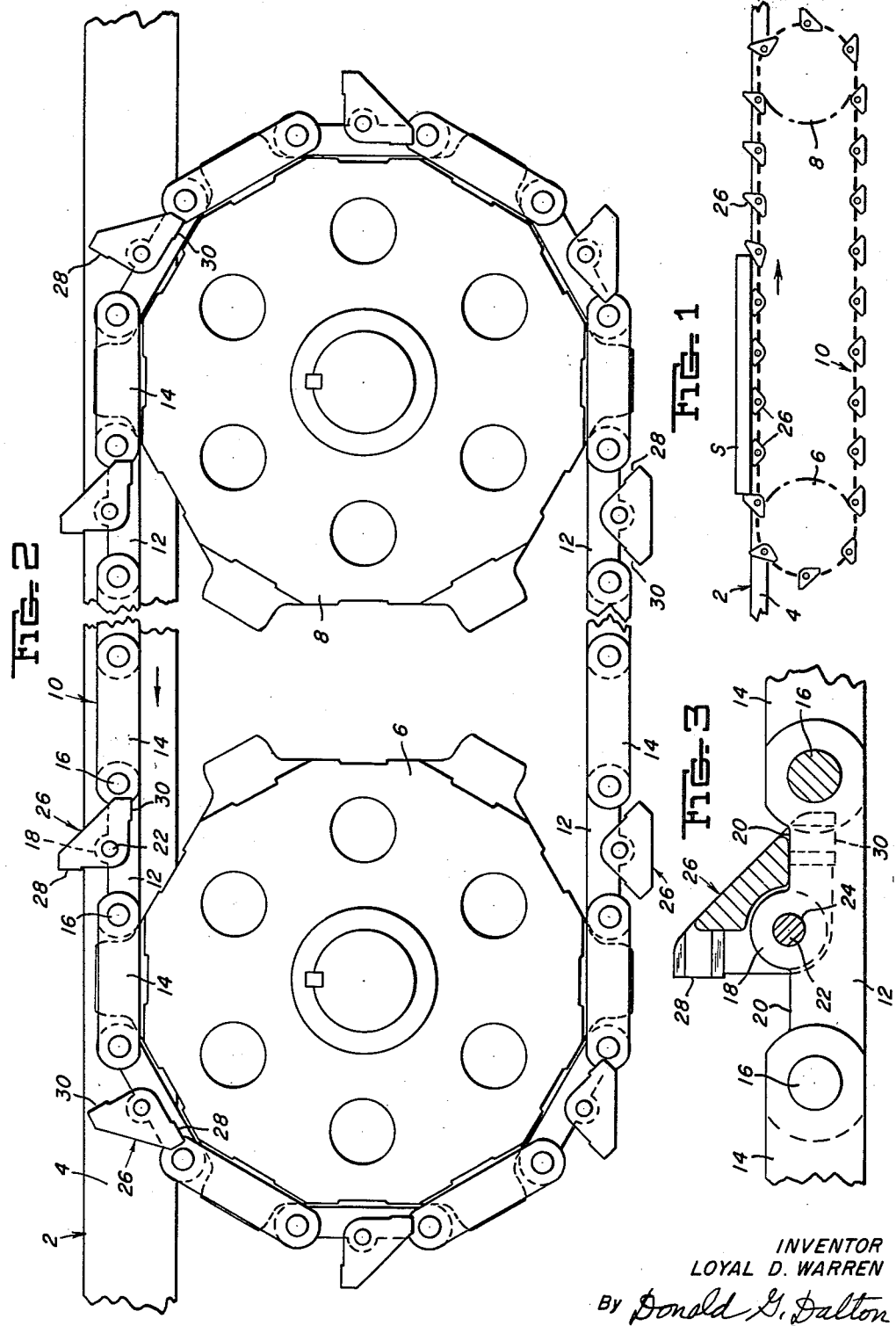
INVENTOR
LOYAL D. WARREN
By Donald G. Dalton
Attorney

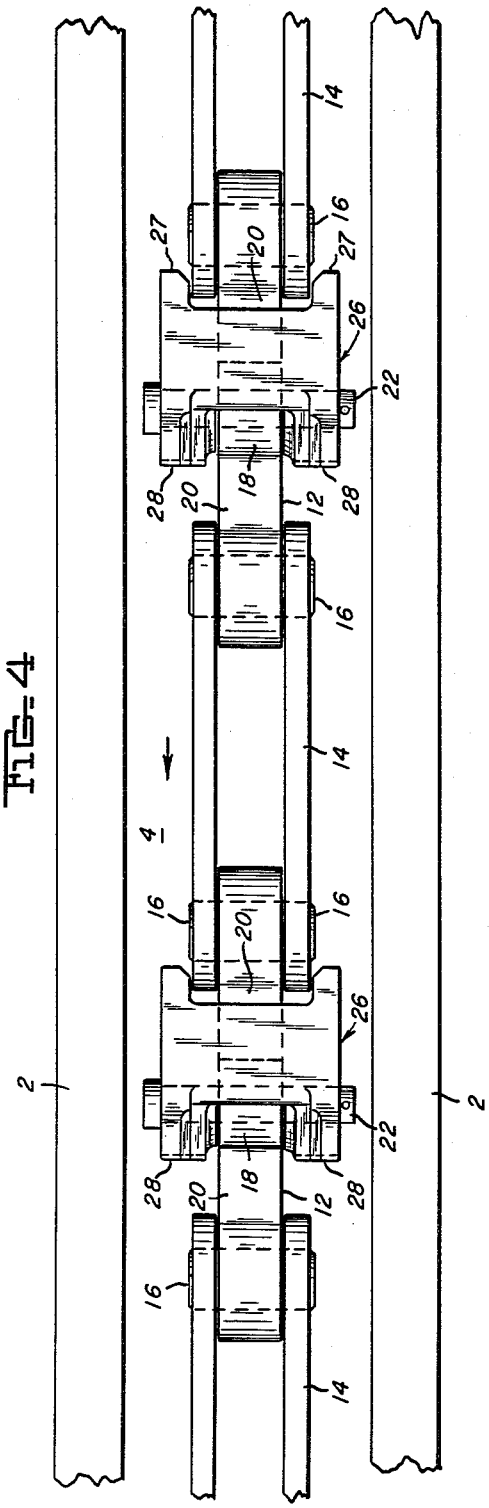
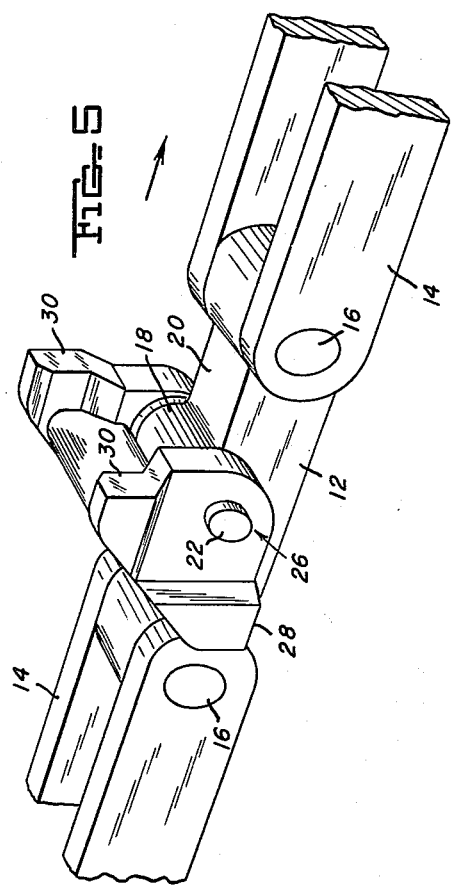

3,110,391
REVERSIBLE CONVEYOR
Loyal D. Warren, Birmingham, Ala., assignor to United States Steel Corporation, a corporation of New Jersey
Filed Apr. 24, 1961, Ser. No. 105,107
6 Claims. (Cl. 198—110)

This invention relates to an article conveyor and more particularly to such conveyors in which articles are moved along skids by means of a dog or dogs extending above the surface of the conveyor skids. In conveyors of this type of which I have knowledge it was necessary to manually reset the dogs when it was desired to reverse the conveyor.

It is therefore an object of my invention to provide a reversible chain conveyor in which the dogs will automatically reverse themselves when the direction of travel of the conveyors is reversed.

Another object is to provide such a conveyor in which the dogs will not interfere with operation of the conveyor and the articles thereon when the length of the article being conveyed exceeds the distance between two adjacent dogs on the chain.

These and other objects will be more apparent after referring to the following specification and attached drawings in which:

FIGURE 1 is a schematic elevation of the conveyor of my invention showing the arrangement of the dogs when the conveyor is moving toward the right;

FIGURE 2 is an elevation of the conveyor of FIGURE 1 to an enlarged scale and showing the arrangement of the dogs when the conveyor is moving in the opposite direction;

FIGURE 3 is a vertical sectional view through a dog showing its connection to the conveyor chain;

FIGURE 4 is a plan view of the conveyor; and

FIGURE 5 is a perspective view of the dog and chain.

Referring more particularly to the drawings reference numeral 2 indicates a generally horizontal plate having a longitudinal slot 4 therein. If desired the slot 4 may be obtained by using spaced apart skids and either construction is contemplated when the term plate and slot are used in the claims. A first sprocket 6 is located below the top of plate 2 adjacent one end of the slot 4 and a second sprocket 8 is located below the top of plate 2 adjacent the other end of the slot 4. It will be seen that the axes of the sprockets 6 and 8 are in substantially the same horizontal plane. Power means, not shown, are provided to drive one of the sprockets. An endless chain 10 passes around the sprockets 6 and 8. Chain 10 is made up of a plurality of longitudinal spaced single links 12 and a plurality of pairs of links 14 which receive the ends of the links 12 therebetween and which are pivotally connected to the associated single links by means of pins 16 as best shown in FIGURES 4 and 5. Each link 12 has a lug 18 at the longitudinal center thereof with a depressed portion 20 on each side thereof with the top of the depressed portions being below the top of the links 14. A pin 22 passes through a horizontal hole 24 in the lug 18. A two-legged dog 26 is pivotally supported on the pin 22. The legs of the dog 26 are substantially at right angles to each other and are bifurcated with the distance between bifurcations 27 being greater than the width of link 12 so that the link 12 can be received therebetween. The width of the legs is less than the width of the slot 4 so that the legs can be received in the slot 4. Load engaging surfaces 28 and 30 are provided on the ends of the legs. It will be noted that the pin 22 passes through the dog 26 adjacent the intersection of the legs thereof and that the length of link 12 is more than twice the length of each leg from the pivot connection.

In the operation of my device with the sprocket 6 rotating in the direction shown in FIGURE 1 each dog 26 will be positioned as shown due to its weight acting at its center of gravity about the pin 22. When each dog 26 reaches the top of the sprocket 6 the upwardly extending leg will protrude through slot 4 and is ready to push the article S toward the sprocket 8. If the article S is pushed onto the skid 2 from the left of FIGURE 1 the dog 26 will rotate in a clockwise direction so that it will not interfere with the progress of the article. Rotation of the dog 26 in a counterclockwise direction is prevented by engagement of the horizontal leg with the depressed portion 20 of link 12. When the end of the article S is pushed entirely onto the skid 2 the next dog 26 to come around sprocket 6 will engage the end of the article S and convey it toward the right end of skid 2 as shown in FIGURE 1. A reversal of the direction of sprockets 6 and 8 will cause the dogs 26 to proceed upwardly around the sprocket 8 where they will be automatically positioned to move the article S toward the sprocket 6 as shown in FIGURE 2. Rotation of the dog 26 in a counterclockwise direction can take place when engaged by the article S, but rotation in a clockwise direction is prevented by engagement of the lower leg with the depressed portion 20 of link 12. Thus it is seen that the dogs 26 will be automatically positioned for moving the object in the direction of travel of the chain.

While one embodiment of my invention has been shown and described it will be apparent that other adaptations and modifications may be made without departing from the scope of the following claims.

I claim:

1. A reversible conveyor for articles comprising spaced apart sprockets mounted with their axes in substantially the same horizontal plane, an endless chain passing around said sprockets, a dog having first and second load engaging surfaces arranged at generally right angles to each other, means for mounting said dog on said chain for movement about a generally horizontal axis, said dog being positioned by gravity as it passes upwardly around one of said sprockets to present the first load engagegent surface to engage an article and being positioned by gravity as it passes upwardly around the other of said sprockets to present the second load engaging surface to engage an article, means on said dog for seating said dog on said chain so that said first load engaging surface engages an article during movement in one direction and said second load engaging surface engages an article during movement in the opposite direction.

2. A reversible conveyor for articles comprising spaced apart sprockets mounted with their axes in substantially the same horizontal plane, an endless chain passing around said sprockets, said chain including a plurality of longitudinally spaced single links, a pair of links extending between each single link one on each side of the associated single link and a generally horizontal pin pivotally connecting each end of said single links to the end of the associated pair of links, a plurality of dogs, each of said dogs having two legs arranged generally at right angles to each other, means adjacent the intersection of said legs for mounting each of said dogs on one of said single links for movement about a generally horizontal axis, and means on each dog for seating it on one of said single links so that one of said legs engages an article during movement in one direction and the other of said legs engages an article during movement in the opposite direction.

3. A reversible conveyor for articles comprising spaced apart sprockets mounted with their axes in substantially the same horizontal plane, an endless chain passing around said sprockets, said chain including a plurality of longitudinally spaced single links, a pair of links extending between each single link one on each side of the associated single link and a generally horizontal pin pivotally connecting each end of said single links to the ends of the associated pair of links, a plurality of dogs, each of said dogs having two bifurcated legs arranged generally at right angles to each other, the distance between the bifurcations on each leg being greater than the width of said single link, means adjacent the intersection of said legs for mounting each of said dogs on one of said single links for movement about a generally horizontal axis, and means on each dog for seating it on one of said single links, said seating means limiting rotation of each dog so that one of said legs engages an article during movement in one direction and the other of said legs engages an article during movement in the opposite direction.

4. A reversible conveyor for articles comprising a generally horizontal plate having a longitudinal slot therein, a first sprocket situated below said plate adjacent one end of said slot, a second sprocket situated below said plate adjacent the other end of said slot, an endless chain around said sprockets, a dog having first and second load engaging surfaces arranged at generally right angles to each other, means for mounting said dog on said chain for movement about a generally horizontal axis, and means on said dogs for seating said dogs on said chain so that said first load engaging surface protrudes through said slot in said plate and engages an article when said chain is driven in one direction and said second load engaging surface protrudes through said slot and engages an article when said chain is driven in the opposite direction.

5. A reversible conveyor for articles comprising a generally horizontal plate having a longitudinal slot therein, a first sprocket situated below said plate adjacent one end of said slot, a second sprocket situated below said plate adjacent the other end of said slot, an endless chain around said sprockets, said chain including a plurality of longitudinally spaced single links, a pair of links extending between each single link one on each side of the associated single link and a generally horizontal pin pivotally connecting each end of said single links to the ends of the associated pair of links, a plurality of dogs, each of said dogs having two legs arranged generally at right angles to each other, the width of said legs being less than the width of said slot, means adjacent the intersection of said legs for mounting each of said dogs on one of said single links for movement about a generally horizontal axis and means on the first of said legs of each of said dogs for seating said dog on one of said single links so that the second of said legs protrudes through said slot in said plate and engages an article when said chain is driven in one direction and means on the second of said legs for seating said dog on one of said single links so that the first of said legs protrudes through said slot and engages an article when said chain is driven in the opposite direction.

6. A reversible conveyor for articles comprising a generally horizontal plate having a longitudinal slot therein, a first sprocket situated below said plate adjacent one end of said slot, a second sprocket situated below said plate adjacent the other end of said slot, an endless chain around said sprockets, said chain including a plurality of longitudinally spaced single links, a pair of links extending between each single link one on each side of the associated single link and a generally horizontal pin pivotally connecting each end of said single links to the ends of the associated pair of links, a plurality of dogs, each of said dogs having two bifurcated legs arranged generally at right angles to each other, the distance between the bifurcations on each leg being greater than the width of said single link and the width of said legs being less than the width of said slot, and means adjacent the intersection of said legs for mounting each of said dogs on one of said single links for movement about a generally horizontal axis, with one of said legs of said dog being adapted to pass through said slot according to the direction of movement of said chain, the length of said single link being more than twice the length of each leg of said dog.

References Cited in the file of this patent

UNITED STATES PATENTS 2,374,659     Bassler _____ May 1, 1945

FOREIGN PATENTS 483,352     Germany _____ Sept. 30, 1929